United States Patent
Lindner et al.

(10) Patent No.: US 11,042,723 B2
(45) Date of Patent: Jun. 22, 2021

(54) SYSTEMS AND METHODS FOR DEPTH MAP SAMPLING

(71) Applicant: QUALCOMM Incorporated, San Diego, CA (US)

(72) Inventors: Albrecht Johannes Lindner, La Jolla, CA (US); Volodimir Slobodyanyuk, San Diego, CA (US); Stephen Michael Verrall, Carlsbad, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 16/359,441

(22) Filed: Mar. 20, 2019

(65) Prior Publication Data
US 2019/0220650 A1    Jul. 18, 2019

Related U.S. Application Data

(63) Continuation of application No. 14/833,573, filed on Aug. 24, 2015, now Pat. No. 10,282,591.

(51) Int. Cl.
*G06K 9/00* (2006.01)
*H04N 13/261* (2018.01)
(Continued)

(52) U.S. Cl.
CPC ........ *G06K 9/00208* (2013.01); *G01S 7/4972* (2013.01); *G01S 17/86* (2020.01);
(Continued)

(58) Field of Classification Search
None
See application file for complete search history.

(56) References Cited

U.S. PATENT DOCUMENTS

| 6,847,462 B1 | 1/2005 | Kacyra et al. |
| 8,989,944 B1 * | 3/2015 | Agarwal ............... G01S 13/589 701/23 |

(Continued)

FOREIGN PATENT DOCUMENTS

| JP | 2010091426 A | 4/2010 |
| JP | 2014508928 A | 4/2014 |

(Continued)

OTHER PUBLICATIONS

Xie M Et Al: "Active and intelligent sensing of road obstacles: Application to the European Eureka-PROMETHEUS project". Computer Vision; 1993. Proceedings., Fourth International Conference O N Berlin, Germany May 11-14, 1993. (Year: 1993).*

(Continued)

*Primary Examiner* — James M Anderson, II
(74) *Attorney, Agent, or Firm* — Michael Kramer

(57) ABSTRACT

A method and electronic device for selectively obtaining depth information at locations within a scene are described. Image content analysis is performed on a received image of the scene. Locations within the image to obtain depth information within the scene are determined based on the image analysis. The locations are provided to a LIDAR (light+radar) unit to selectively obtain depth information at the scene locations. The depth information is received from the LIDAR unit and a second image analysis is performed on a second image. The second image analysis is based on the image content of the second image and the received depth information. Updated locations based on the second image analysis may be provided to the LIDAR unit to obtain updated depth information.

30 Claims, 9 Drawing Sheets

(51) Int. Cl.
*G01S 17/89* (2020.01)
*G01S 7/497* (2006.01)
*G06T 7/50* (2017.01)
*G01S 17/86* (2020.01)

(52) U.S. Cl.
CPC .......... *G01S 17/89* (2013.01); *G06K 9/00744* (2013.01); *G06T 7/50* (2017.01); *H04N 13/261* (2018.05); *G06T 2207/10024* (2013.01); *G06T 2207/10028* (2013.01)

(56) References Cited

U.S. PATENT DOCUMENTS

| | | |
|---|---|---|
| 9,188,433 B2 | 11/2015 | Atanassov et al. |
| 9,208,548 B1 | 12/2015 | Noble et al. |
| 9,406,137 B2 | 8/2016 | Ahuja et al. |
| 9,448,064 B2 | 9/2016 | Atanassov et al. |
| 9,607,015 B2 | 3/2017 | Gao et al. |
| 10,346,465 B2 | 7/2019 | Gao et al. |
| 2005/0223337 A1 | 10/2005 | Wheeler et al. |
| 2008/0027591 A1 | 1/2008 | Lenser et al. |
| 2012/0081544 A1 | 4/2012 | Wee |
| 2013/0136338 A1 | 5/2013 | Asente et al. |
| 2014/0118716 A1 | 5/2014 | Kaganovich |
| 2014/0132721 A1 | 5/2014 | Martinez Bauza et al. |
| 2014/0132722 A1 | 5/2014 | Martinez et al. |
| 2014/0132723 A1 | 5/2014 | More |
| 2015/0178930 A1 | 6/2015 | Gao et al. |
| 2016/0292872 A1 | 10/2016 | Hammond et al. |
| 2017/0061632 A1 | 3/2017 | Lindner et al. |

FOREIGN PATENT DOCUMENTS

| | | |
|---|---|---|
| JP | 2015520433 A | 7/2015 |
| WO | 2013176807 | 11/2013 |
| WO | 2013176808 | 11/2013 |
| WO | 2014078005 | 5/2014 |
| WO | 2014200665 | 12/2014 |
| WO | 2015095754 | 6/2015 |
| WO | 2015095764 | 6/2015 |
| WO | 2015095781 | 6/2015 |
| WO | 2015097824 A1 | 7/2015 |

OTHER PUBLICATIONS

Bourbakis N., et al.,"Fusing laser and image data for 3d perceived space representations," Proceedings of the 9th international conference on tools with artificial intelligence. ICTAI '97, Newport Beach, CA, Nov. 3-8, 1997; [IEEE International Conference On Tools With Artificial Intelligence], Los Alamitos, CA : IEEE Computer Soc , US, Nov. 3, 1997 (Nov. 3, 1997) , pp. 50-58, XP000782960, ISBN: 978-0-8186-8204-9.

International Search Report and Written Opinion—PCT/US2016/041782—ISA/EPO—Oct. 20, 2016.

Maciej S., et al., "Multimodal Segmentation of Dense Depth Maps and Associated Color Information," Sep. 24, 2012 (Sep. 24, 2012), Correct System Design; [Lecture Notes in Computer Science; lect. Notes computer], Springer International Publishing, CRAM, pp. 626-632, XP047269639, ISSN: 0302-9743 ISBN: 978-3-642-02770-3.

Philippe P., et al., "Scene Analysis using Fusion of Range and Color Data," 9th European Signal Processing Conference (EUSIPCO 1998), IEEE, Sep. 8, 1998 (Sep. 8, 1998), pp. 1-5, XP032766895, ISBN: 978-960-7620-06-4 [retrieved on Apr. 20, 2015].

Ruppert L., et al., "Control Architecture for an Adaptive Electronically Steerable Flash Lidar and Associated Instruments," Proceedings of SPIE, 2014, vol. 9223, pp. 92230A-1 to 92230A-10.

Stuckler J., et al., "Combining Depth and Color Cues for Scale and Viewpoint-invariant Object Segmentation and Recognition using Random Forests," Intelligent Robots and Systems (IROS), 2010 IEEE/RSJ International Conference On, IEEE, Piscataway, NJ, USA, Oct. 18, 2010 (Oct. 18, 2010), pp. 4566-4571, XP031815443, ISBN: 978-1-4244-6674-0.

Xie M., et al.,"Active and Intelligent Sensing of Road Obstacles: Application to the European Eureka-PROMETHEUS Project," Computer Vision, 1993, Proceedings., Fourth International Conference on Berliin, Germany May 11-14, 1993, Los Alamitos, CA, USA,IEEE Computer Soci, May 11, 1993 (May 11, 1993), pp. 616-623, XP010128563, DOI: 10.1109/ICCV.1993.378154 ISBN: 978-0-8186-3870-1.

\* cited by examiner

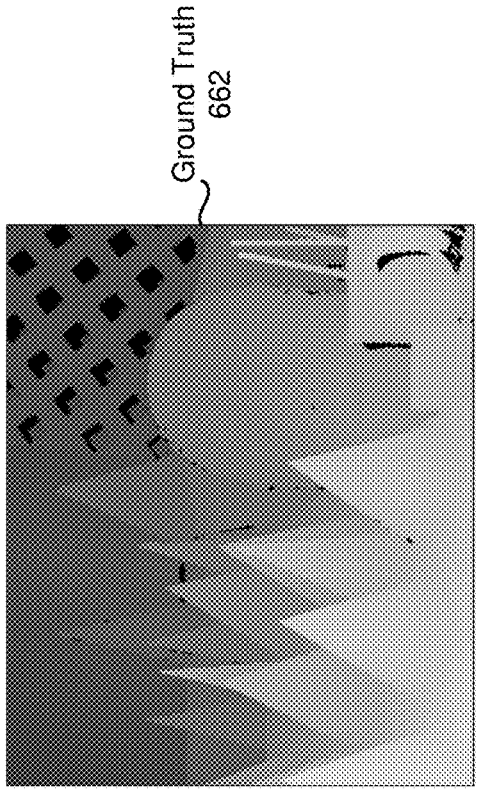
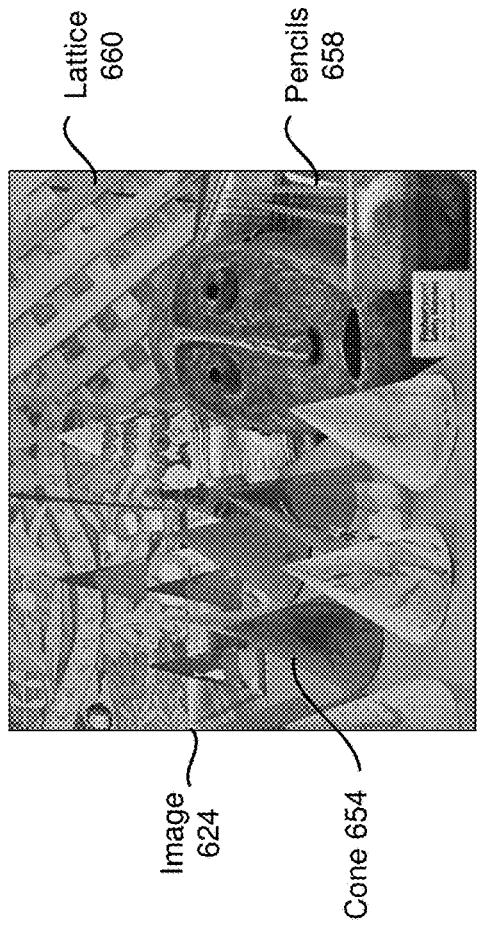
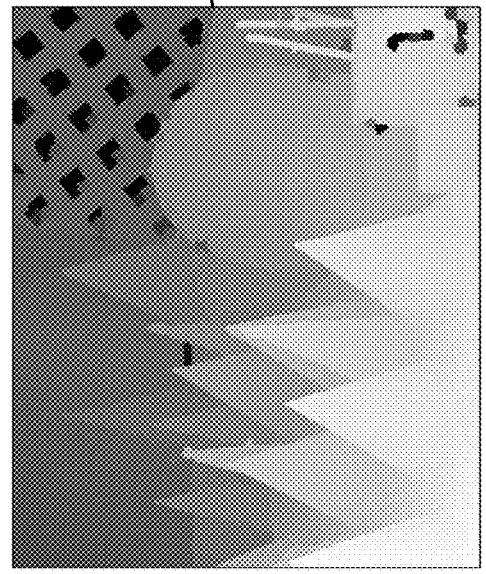
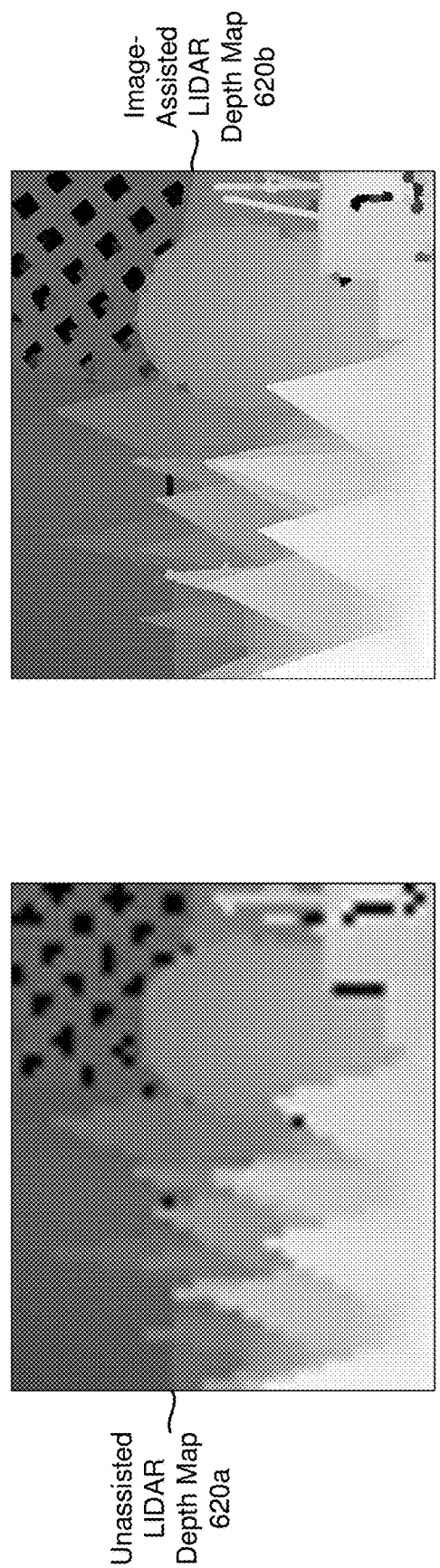
FIG. 6A
FIG. 6B
FIG. 6C
FIG. 6D

SYSTEMS AND METHODS FOR DEPTH MAP SAMPLING

CROSS REFERENCE TO RELATED APPLICATIONS

This application is a Continuation of U.S. patent application Ser. No. 14/833,573, entitled "SYSTEMS AND METHODS FOR DEPTH MAP SAMPLING," filed Aug. 24, 2015, which is hereby expressly incorporated by reference herein in its entirety and for all applicable purposes.

FIELD OF DISCLOSURE

The present disclosure relates generally to electronic devices. More specifically, the present disclosure relates to systems and methods for depth map sampling.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) may create a depth map using a LIDAR (light+radar) scan. A dense sampling of a scene using LIDAR scanning is costly in terms of time and power. This may result in low frame rates and battery drainage. As can be observed from this discussion, systems and methods that improve LIDAR depth map sampling may be beneficial.

SUMMARY

An electronic device is described. The electronic device includes a camera configured to capture an image of a scene. The electronic device also includes an image segmentation mapper configured to perform segmentation of the image based on image content to generate a plurality of image segments, each of the plurality of image segments associated with spatial coordinates indicative of a location of each segment in the scene. The electronic device further includes a memory configured to store the image and the spatial coordinates. The electronic device additionally includes a LIDAR (light+radar) unit, the LIDAR unit steerable to selectively obtain depth values corresponding to at least a subset of the spatial coordinates. The electronic device further includes a depth mapper configured to generate a depth map of the scene based on the depth values and the spatial coordinates.

At least a portion of the image segments comprise non-uniform segments that define borders of an object within the image. The image segmentation mapper may be configured to perform segmentation based on an image complexity. A quantity of segments generated may be a function of a determined complexity of the image.

The LIDAR unit may be configured to perform a coarse scan over a region of the scene containing a substantially uniform object within the scene. The image segmentation mapper may be configured to provide the spatial coordinates to the LIDAR unit and may be configured to provide the segments of the image to the depth mapper.

The depth mapper may be configured to generate the depth map by merging the segments with corresponding depth values. The depth mapper may be configured to generate the depth map by populating each segment with a corresponding depth value obtained by the LIDAR unit at the spatial coordinates.

The number of depth values obtained by the LIDAR unit may be configured to be adjusted based on feedback from a prior depth map. The spatial coordinates of the segments may correspond to centroids of the segments.

A method is also described. The method includes capturing an image of a scene. The method also includes performing segmentation of the image based on image content to generate a plurality of image segments, each of the plurality of segments associated with spatial coordinates indicative of a location of each segment in the scene. The method further includes obtaining, by a LIDAR (light+radar) unit, depth values corresponding to at least a subset of the spatial coordinates. The LIDAR unit is steerable to selectively obtain the depth values. The method additionally includes generating a depth map of the scene based on the depth values and the spatial coordinates.

An apparatus is also described. The apparatus includes means for capturing an image of a scene. The apparatus also includes means for performing segmentation of the image based on image content to generate a plurality of image segments, each of the plurality of image segments associated with spatial coordinates indicative of a location of each segment in the scene. The apparatus further includes means for obtaining, by a LIDAR unit, depth values corresponding to at least a subset of the spatial coordinates. The LIDAR unit is steerable to selectively obtain the depth values. The apparatus additionally includes means for generating a depth map of the scene based on the depth values and the spatial coordinates.

A computer-program product is also described. The computer-program product includes a non-transitory tangible computer-readable medium having instructions thereon. The instructions include code for causing an electronic device to capture an image of a scene. The instructions also include code for causing the electronic device to perform segmentation of the image based on image content to generate a plurality of image segments, each of the plurality of image segments associated with spatial coordinates indicative of a location of each segment in the scene. The instructions further include code for causing the electronic device to obtain, by a LIDAR unit, depth values corresponding to at least a subset of the spatial coordinates. The LIDAR unit is steerable to selectively obtain the depth values. The instructions additionally include code for causing the electronic device to generate a depth map of the scene based on the depth values and the spatial coordinates.

BRIEF DESCRIPTION OF THE DRAWINGS

FIGS. 6A-6D illustrate an example of image-assisted LIDAR depth map sampling;

DETAILED DESCRIPTION

In many applications, it is important to generate a depth map of objects in a scene. For example, with advanced driver assistance systems (ADAS), it is important to identify the drivable area in front of the car for obstacle avoidance. Obstacle detection may use a depth map to identify traffic signs (e.g., speed limit signs, stop signs, street signs, etc.). Another scenario in which a depth map is important is vehicular automation in which an autonomous vehicle (e.g., an unmanned aerial vehicle (UAV) or autonomous automobile) senses its environment and navigates without human input.

Depth map generation may also be useful in various productivity and entertainment scenarios. For example, a depth map of a room or an environment may be utilized in gamming, augmented or virtual reality, 3-D reconstruction, safety and security and similar applications. Still further, a depth may be referenced for image and/or video capture to, for example, assist in autofocus operations. In these and other scenarios, it may be advantageous to intelligently acquire a depth map that accurately and precisely captures depth information of a scene, room, or environment.

LIDAR (light+radar) scanning may be used to sample depth values of objects. In LIDAR, a laser may illuminate an object and the distance (i.e., depth value) of the object from a reference location may be determined by analyzing the reflected light. A dense sampling of the scene is costly in terms of time and power resulting in low frame rates and battery drainage. However, a uniform (i.e., naïve) LIDAR scan at regular points may result in a poor quality depth map. Similarly, even a dense sample may still miss small objects, resulting in depth map errors, when a uniform or predefined scan pattern irrespective of scene content is employed.

In the systems and methods described herein, instead of performing a LIDAR scan based on uniform scan points, a LIDAR unit may perform image-assisted LIDAR depth map sampling. A camera positioned near the LIDAR unit may capture one or more images of the scene. This image or set of images may be segmented. The segments may follow the borders of the objects in the image, thus preserving the edges of the objects. The spatial coordinates (X, Y position) of, for example, the centroids of the segments may be provided to the LIDAR unit, which performs a LIDAR scan at those spatial coordinates. The depth values generated from the scan by the LIDAR unit may be populated in the corresponding segments to create the depth map for the scene. For example, each segment may be given a uniform depth associated with the depth of the respective segment centroid. Systems and methods for image-assisted LIDAR depth map sampling are explained in greater detail below.

Figure 1:
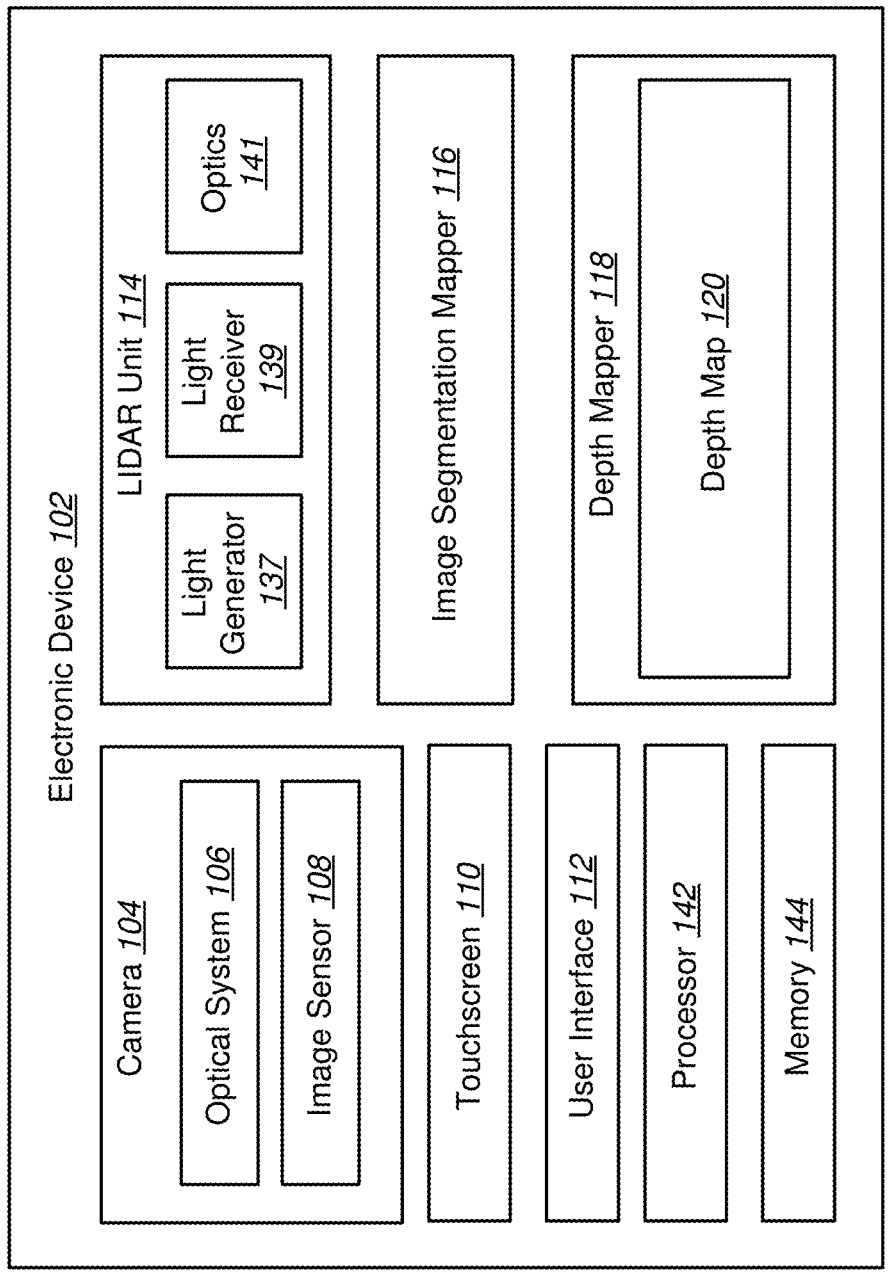
FIG. 1 is a block diagram illustrating an electronic device configured to perform image-assisted LIDAR (light+radar) depth map sampling.

FIG. 1 is a block diagram illustrating an electronic device 102 configured to perform image-assisted LIDAR depth map sampling. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, e-readers, tablet devices, gaming systems, robots, aircraft, unmanned aerial vehicles (UAVs), automobiles, etc. Some of these devices may operate in accordance with one or more industry standards.

In many scenarios, the electronic device 102 may use a depth map 120 of a scene. In one example, a smartphone may generate a depth map 120 of a scene. In another example, an automobile may include an advanced driver assistance system (ADAS) that may use a depth map 120 to regulate speed, steering, parking, etc., of the automobile based on detected traffic signs, signals and/or other objects. In another example, an unmanned aerial vehicle (UAV) may generate a depth map 120 from video recorded while in flight, may navigate based on detected objects (e.g., buildings, signs, people, packages, etc.), may pick up and/or deliver a detected package, etc. Many other examples may be implemented in accordance with the systems and methods disclosed herein. For instance, the systems and method disclosed herein could be implemented in a robot that performs one or more actions (e.g., fetching something, assembling something, searching for an item, etc.) based on one or more objects detected using the depth map 120.

An electronic device 102, such as a smartphone or tablet computer, for example, may include a camera 104. The camera 104 may include an image sensor 108 and an optical system 106 (e.g., lenses) that focuses images of objects that are located within the field of view of the optical system 106 onto the image sensor 108. The camera 104 may be configured to capture digital images. In an implementation, the digital images may be color images. Although the present systems and methods are described in terms of captured images, the techniques discussed herein may be used on any digital image. Therefore, the terms video frame and digital image may be used interchangeably herein. Likewise, in certain implementations the electronic device 102 may not include a camera 104 and optical system 106, but may receive or utilize stored digital images.

The electronic device 102 may also include a camera software application and a display screen. When the camera application is running, images of objects that are located within the field of view of the optical system camera 104 may be recorded by the image sensor 108. The images that are being recorded by the image sensor 108 may be displayed on the display screen. These images may be displayed in rapid succession at a relatively high frame rate so that, at any given moment in time, the objects that are located within the field of view of the camera 104 are displayed on the display screen.

A user interface 112 of the camera application may permit one or more objects that are being displayed on the display screen to be selected. In one configuration, the display is a touchscreen 110 that receives input from physical touch, e.g., by a finger, stylus or other tool. The touchscreen 110 may receive touch input defining a target object. Target objects may be selected in any suitable way. For example, facial recognition, pedestrian recognition, etc., may be used to select a target object.

The electronic device 102 may also include a LIDAR unit 114. LIDAR (light+radar) is a remote sensing technology that measures distance by illuminating a target with a laser and analyzing the reflected light. The LIDAR unit 114 may sample a scene to determine depth values to objects within the scene. Thus, the LIDAR unit 114 may comprise a light generating (laser) portion 137 and a light receiving (sensor) portion 139. The LIDAR unit may further comprise various optics 141 to facilitate generating and receiving light as well as additional features as described below.

In an implementation, the LIDAR unit 114 may send a laser pulse in some direction and may measure the time that it takes for the laser pulse to come back to the LIDAR unit 114. This process is analogous to radar where a signal is sent and an echo is received. The LIDAR unit 114 may record the time difference between sending the laser and receiving reflected light. From this time difference, the LIDAR unit 114 may obtain a depth value that represents a distance estimate. In some implementations, the time measurement, recording, and/or obtaining the depth value may be performed outside the LIDAR unit 114, for example, in one or more processors 142 within or remote to the electronic device 102. In some implementations, memory 144 may store information associated with image-assisted LIDAR depth map sampling (e.g., the image, depth values, segments and depth map 120).

A laser of the LIDAR unit 114 may be directed to different locations, for example, locations identified through an image segmentation process. Therefore, the laser may be steerable. In one approach, the laser may be mechanically directed. For example, the laser may be directed with mirrors or actuators. In another example, the laser may be directed via electronically steerable optical elements. In this approach, the LIDAR unit 114 may have no moving parts and offers more flexibility.

A dense sampling of the scene by the LIDAR unit 114 is costly in terms of time and power. This may reduce the frame rate (e.g., the number of images captured by the camera 104) that an electronic device 102 may process. Furthermore, this is especially concerning for platforms that use batteries. Sending light pulses consumes a significant amount of power. For a mobile platform (e.g., a mobile phone) that is powered by a battery, sampling the surrounding scene at an incredibly high rate may quickly drain the battery. Time consuming acquisition and/or generation of depth maps may also be concerning in platforms that are not, or less, power constrained than a mobile platform. For instance, speed may be advantageous in situations where scenes from which to capture depth information are dynamic (e.g., various (manned and unmanned) terrestrial and air vehicles, robots, etc.).

Furthermore, there is a problem with determining the best locations to perform a LIDAR scan. Some approaches may perform a uniform LIDAR scan. For example, a rotating mirror approach may obtain an equal sampling of the scene where the LIDAR scans are performed in equal or uniform increments. This approach may be referred to as a naïve LIDAR scan. In this approach, the mirror rotates at a certain speed and the LIDAR sends a laser pulse every so many milliseconds. The uniform speed of the rotation and uniform laser pulse, gives a uniform sampling of the scene, that is to say a uniform or other predefined two-dimensional grid of points across the horizontal and vertical extent of the scene. However, this approach may not detect certain objects within a scene. For example, a uniform LIDAR sampling may not detect thin objects that fall in between sampling points.

The systems and methods described herein provide for image-assisted LIDAR depth map sampling. The LIDAR unit 114 may perform a LIDAR scan assisted by an image captured by the camera 104. The LIDAR unit 114 may adapt the depth sampling in response to the scene content as captured by the image.

In an implementation, the electronic device 102 may include an image segmentation mapper 116. The camera 104 may provide a captured image to the image segmentation mapper 116. The image segmentation mapper 116 may segment the image to generate a segmentation map. The segmentation map may include multiple segments. The centroid of a segment may have spatial coordinates. The image segmentation mapper 116 may send the spatial coordinates of the segment centroids to the LIDAR unit 114. The image segmentation mapper 116 may also provide the segments to a depth mapper 118.

The LIDAR unit 114 may perform a LIDAR scan based on the received spatial coordinates. In an implementation, the LIDAR unit 114 may sample the depth of the scene at each segment's centroid using the steerable LIDAR. The LIDAR unit 114 and camera 104 may be located near each other. The LIDAR unit 114 and camera 104 may be aligned such that they have substantially the same field of view (FOV). The LIDAR unit 114 and camera 104 may be calibrated with respect to each other. For example, the zoom or the camera 104 and the LIDAR unit 114 may be calibrated.

For an accurate scene coordinate the system can use a sampling coordinate (e.g., centroid), the calibration parameters and the previous depth map. For example, the LIDAR unit 114 may steer the laser to determine depth values of the scene at the spatial coordinates of the centroids. In one implementation, the LIDAR unit 114 may determine the depth values and send the depth values to the depth mapper 118. In another implementation, the LIDAR unit 114 may send raw data (e.g., time measurements) to a processor 142 for determination of the depth values. The processor 142 may then provide the depth values to the depth mapper 118.

Upon receiving the segments from the image segmentation mapper 116 and the depth values from the LIDAR unit 114, the depth mapper may populate each segment with the depth value of its centroid to create a depth map 120. More detail on image-assisted LIDAR depth map sampling is given in connection with FIG. 2.

The described systems and methods provide for depth sampling that adapts to scene content. For example, the LIDAR unit 114 may be instructed to perform a relatively coarse scan (fewer points per unit area) over a region of the scene containing a large and substantially uniform object within an image of the scene, while the LIDAR unit 114 may be instructed to perform a relatively fine scan (greater points per unit area) over a region of the scene containing an object that is small, varied in geometry, and/or includes multiple adjacent or proximate objects.

Accordingly, by adaptively generating the scan pattern based on scene content, a depth map may be efficiently obtained without sacrificing accuracy. Indeed, accuracy (i.e., the depth map 120 of the scene approaching ground truth) may be improved over uniformly spaced scans by capturing points at objects or portions of objects that may, for example, be missed using a uniform scan. This results in higher accuracy of depth maps 120 and a higher frame rate. Because the LIDAR scan is optimized based on the captured image, this results in less power consumption, which is especially important for battery powered applications.

Figure 2:
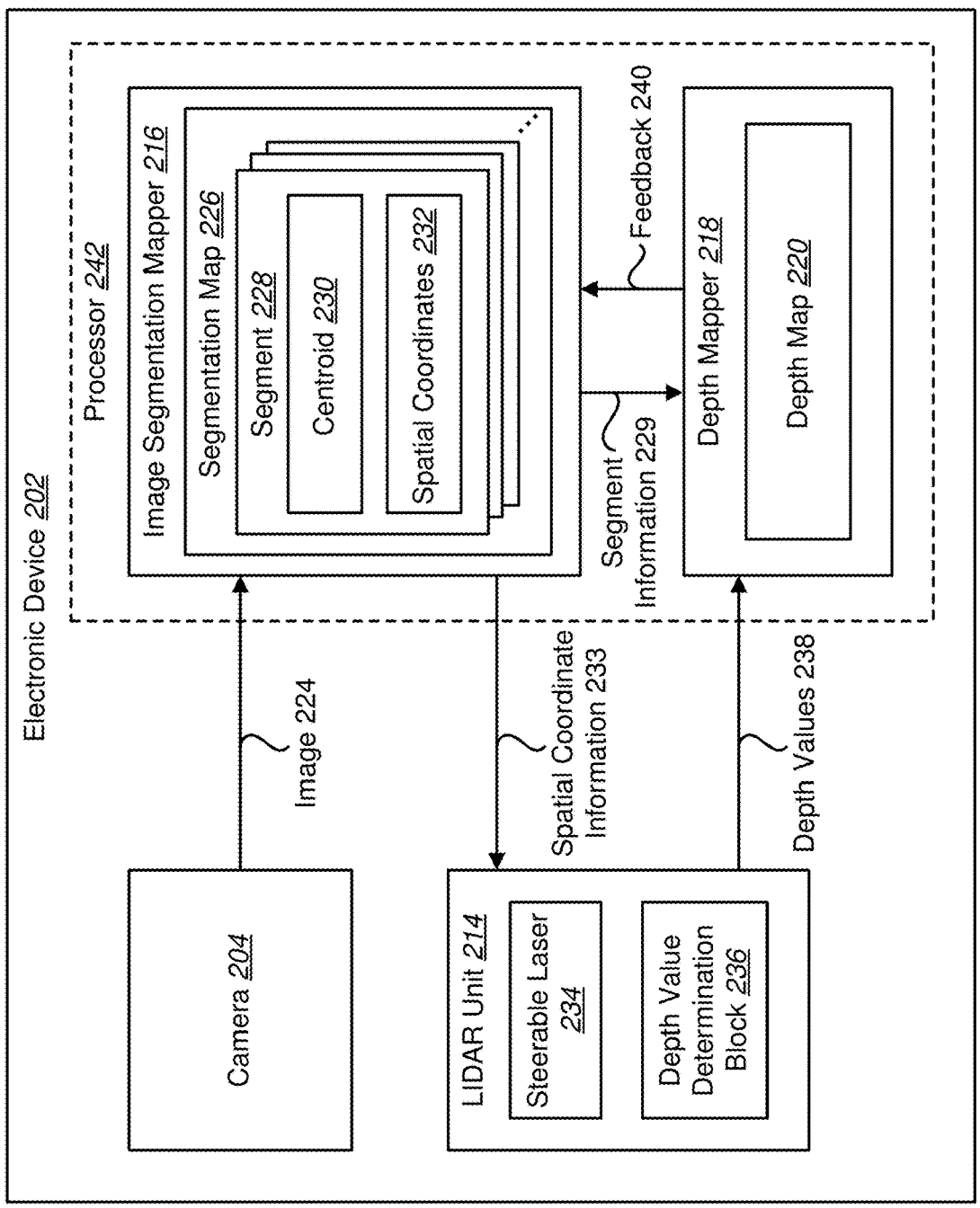
FIG. 2 is a block diagram illustrating another configuration of an electronic device configured to perform image-assisted LIDAR depth map sampling.

FIG. 2 is a block diagram illustrating another configuration of an electronic device 202 configured to perform image-assisted LIDAR depth map sampling. The electronic device 102 may include a camera 204, an image segmentation mapper 216, a LIDAR unit 214, and a depth mapper 218. The camera 204, image segmentation mapper 216, LIDAR unit 214, and depth mapper 218 may be configurations of the camera 104, image segmentation mapper 116, LIDAR unit 214, and depth mapper 118 described above in connection with FIG. 1.

The camera 204 may be positioned on or near the LIDAR unit 214. For example, the camera 204 may be mounted next to the LIDAR unit 214 on the electronic device 202. The camera 204 and the LIDAR unit 214 may be oriented such they have approximately the same view of a scene 222. The scene 222 may include one or more objects at different locations. Therefore, the one or more objects may be at the same or different depths (e.g., distances) from the camera 204 and the LIDAR unit 214.

The camera 204 may capture an image 224 of the scene 222. The image 224 may be a digital color image. Color images may provide better performance for segmentation than gray level images. In an example of an image of a red ball on green grass, the image may be easy to segment in the color domain, but it could be that the gray levels of the grass and the ball are similar, resulting in inaccurate segment boundaries.

The image 224 may be composed of a plurality of pixels. Each pixel may have a spatial coordinate 232. In an implementation, the spatial coordinates 232 may be expressed as Cartesian coordinates (e.g., x-y coordinates), where x corresponds to the horizontal location of a pixel and y corresponds to a vertical location of a pixel.

The camera 204 may provide the image 224 to the image segmentation mapper 216. The image segmentation mapper 216 may generate a segmentation map 226 from the image 224. The segmentation map 226 may be composed of a plurality of segments 228. Each segment 228 may be identified by spatial coordinates 232. For example, a segment 228 may be identified by the spatial coordinates 232 associated with its centroid 230.

The image segmentation mapper 216 may generate the segmentation map 226 using low-level computer vision techniques. The segments 228 may be determined based on the content of the image 224. The segments 228 may be non-uniform, having an irregular geometry, size, and distribution in response to the content of the image 224. One or more segments 228 may define borders of an object in the image 224. The borders of the segments 528 follow the object borders or edges from the image 224. For example, the image segmentation mapper 216 may determine where the borders are between objects in the image 224. The segments 228 may be generated to preserve the borders (e.g., edges) between objects in the image 224. An example of a segmentation map 226 is described in connection with FIG. 5.

The image segmentation mapper 216 may determine the spatial coordinates 232 identifying each segment 228 in the segmentation map 226. The spatial coordinates 232 are indicative of a location of each segment 228 in the scene 222. In one implementation, the image segmentation mapper 216 may determine the spatial coordinates 232 of the centroids 230 of each segment 228. The centroid 230 of a given segment 228 is the geometric center of the segment 228. The centroid 230 may be determined as the arithmetic mean (e.g., average) position of all the points in the segment 228. The centroid 230 of a segment 228 has an associated spatial coordinate 232. For example, a centroid 230 may be expressed in terms of an x (e.g., horizontal) coordinate and a y (e.g., vertical) coordinate.

The spatial coordinates 232 of a segment 228 may be identified by other approaches. In one approach, the spatial coordinates 232 of a segment 228 may correspond to the center of a bounding box around the segment 228. In another approach, if the segments 228 are computed with a clustering algorithm (e.g., K-means), the cluster center at the last iteration may be used as the sampling point (e.g., the spatial coordinates 232) of the segment 228. In yet another approach, with morphological erosion of a segment 228, the last point standing is the sampling position (e.g., the spatial coordinates 232).

The number of segments 228 generated by the image segmentation mapper 216 may be determined according to different approaches. In one approach, the number of segments 228 may be a fixed number (e.g., 2,000 segments). In another approach, the number of segments 228 may be a maximum number. In yet another approach, the number or quantity of segments 228 may vary based on feedback 240 from the generated depth map 220, as described below. In another approach, the number or quantity of segments 228 may be determined as a function of image content. For example, a complex scene 222 (e.g., numerous objects, small objects, varied objects) may utilize a greater number of segments 228 relative to a less complex scene (e.g., few objects, large objects, uniform objects). Various approaches (measures indicative of: quantity of edges, edge length, color, color difference, etc.) may be utilized to determine the complexity of a scene which may be used to derive the quantity of segments 228.

The image segmentation mapper 216 may provide the spatial coordinates 232 of the segments 228 to the LIDAR unit 214. For example, the image segmentation mapper 216 may send spatial coordinate information 233 that includes the spatial coordinates 232 of the centroids 230 to the LIDAR unit 214. The image segmentation mapper 216 may also provide the segment 228 of the image 224 to the depth mapper 218. For example, the image segmentation mapper 216 may send segment information 229 to the depth mapper 218.

The LIDAR unit 214 may perform a LIDAR scan based on the spatial coordinates 232 of the segments 228. Therefore, the spatial coordinates 232 may be sampling points for the LIDAR unit 214 to perform a LIDAR scan.

The LIDAR unit 214 may include a steerable laser 234 and a depth value determination block 236. The steerable laser 234 may be calibrated to move according to the spatial coordinates 232 of the image 224. Therefore, the direction of the steerable laser 234 may be coordinated with the spatial coordinates 232 of the image 224. The camera 204 and the steerable laser 234 may be calibrated such that the spatial coordinates 232 of the image may be transformed to a position of the steerable laser 234. Therefore, by aligning and calibrating the camera 204 and the steerable laser 234, the electronic device 202 may determine a transformation from image space to LIDAR space.

In some implementations, the LIDAR unit 214 may receive scanning instructions from a processor, such as processor 242. The scanning instructions may include commands and/or information for positioning, steering, directing, or otherwise achieving movement of the LIDAR unit 214 to sample the scene 222. In yet other implementations, the LIDAR unit 214 may receive the segments 228 or the image 224 and generate the segments 228 and/or the centroids 230.

It should be noted that the depth values 238 may be transformed from LIDAR space to image space. Depth data (e.g., depth values 238) are coordinates in the world coordinate system (i.e. XYZ space). These 3D coordinates can be projected onto the image 224 (i.e., image space) by a projective transform. The transform can be estimated from, for example, a calibration target.

The steerable laser 234 may be steered to take samples of the scene 222 at the points corresponding to the spatial coordinates 232 of the segments 228. It should be noted that because the LIDAR scan is based on the spatial coordinates 232 of the segmentation map 226, the LIDAR scan may be a non-uniform scan.

The depth value determination block 236 may determine the depth values 238 at the spatial coordinates 232 of the segments 228. This may be accomplished by analyzing the amount of time that it takes light to reflect off of an object in the scene 222 and be received. The LIDAR unit 214 may provide the depth values 238 to the depth mapper 218. In another implementation, the LIDAR unit 214 may provide data, for example timing data indicative of depth values, to the processor 242 to calculate the depth values 238.

The depth mapper 218 may create a depth map 220 by merging the segments 228 provided by the image segmentation mapper 216 with the depth values 238 provided by the LIDAR unit 214. In one approach, the depth mapper 218 may populate each segment 228 with the depth value 238 of corresponding centroid 230 as determined by the LIDAR unit 214. In other words, the depth mapper 218 may populate each pixel within a segment 228 with the depth value 238 of that segment's centroid 230. In this approach, the depth map 220, therefore, includes the depth values 238 of the segments 228, where a given segment 228 has a single depth value 238.

In another approach, the depth mapper 218 may use the weighted average of adjacent segments 228 to populate each segment 228 with the depth value 238. For example, the depth mapper 218 may populate the segments 228 of the same object according to the weighted adjacent segments 228. The weighted average of adjacent segments 228 may be influenced by the similarity in color between the segments 228 and/or the length of their common boundary.

In yet another approach, the distance from the centroid 230 can also be a parameter to influence the interpolation of depth values 238. The depth mapper 218 may create the depth map 220 by merging the segments 228 with the depth values 238 based on the distance from the centroid 230.

The electronic device 202 may use the depth map 220 for various applications. For example, in one application, the electronic device 102 may use the depth map 220 for building three-dimensional models of an object as the electronic device 102 moves around the object. In another application, the electronic device 102 may use the depth map 220 for indoor navigation where the electronic device 102 is mounted on a car that is driving though a parking garage. The depth map 220 may be used for auto-focus applications for the camera 204. Other applications of the depth map 220 may be for creating a map of objects in the scene 222, object detection (e.g., pedestrian detection, traffic signal detection, etc.), autonomous driving, and UAV navigation.

In an implementation, the image segmentation mapper 216 may adjust segments 228 of the image 224 using feedback 240 from a prior depth map 220. The depth mapper 218 may provide feedback 240 to the image segmentation mapper 216. The image segmentation mapper 216 may generate more or fewer segments 228 based on the feedback 240 from the depth mapper 218 to optimize segmentation.

For example, if two neighboring segments 228 have a similar color, and they have the same depth values 238 in the last 10 frames, then the image segmentation mapper 216 may combine the two segments 228 into one segment 228 for the next frame. The LIDAR unit 214 may then take one sample for the combined segment 228, instead of two samples. This may further improve frame rate and reduce battery consumption.

As illustrated in FIG. 2, one or more of the illustrated components may be optionally implemented by a processor 242. In some configurations, different processors may be used to implement different components (e.g., one processor may implement the image segmentation mapper 216, another processor may be used to implement the depth value determination block 236, and another processor may be used to implement the depth mapper 218).

Figure 3:
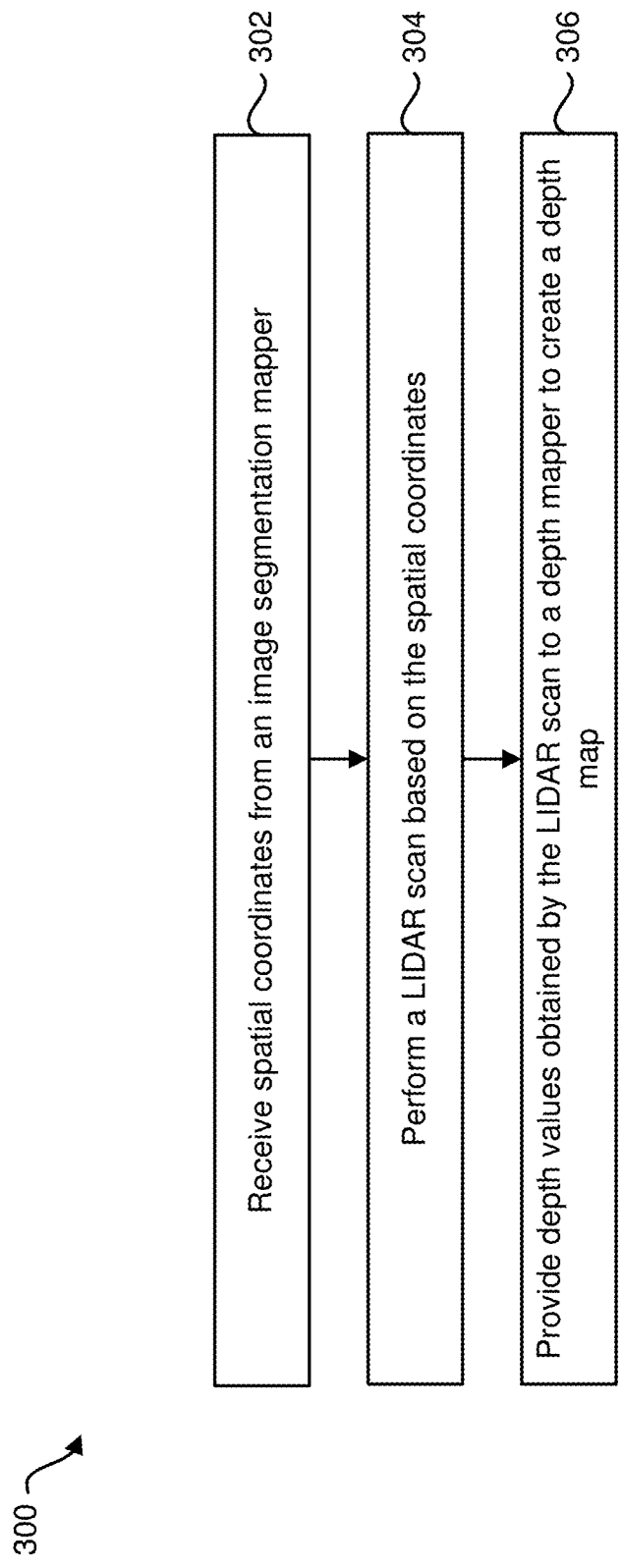
FIG. 3 is a flow diagram illustrating a method for performing image-assisted LIDAR depth map sampling.

FIG. 3 is a flow diagram illustrating a method 300 for performing image-assisted LIDAR depth map sampling. The method 300 may be implemented by an electronic device 202 as depicted in FIG. 2. Specifically, the method 300 may be implemented by a LIDAR unit 214 of the electronic device 202. In some implementations, the method may 300 may be implemented in part by LIDAR unit 214 and a processor, e.g., processor 242, in the electronic device 202.

With reference to FIG. 2 and FIG. 3, the LIDAR unit 214 may receive 302 spatial coordinates 232 from an image segmentation mapper 216. The spatial coordinates 232 may be generated based on an image 224 of a scene 222. For example, the image segmentation mapper 216 may receive the image 224 from a camera 204 positioned on or near the LIDAR unit 214. The image segmentation mapper 216 may generate a segmentation map 226 from the image 224. The segmentation map 226 may include a plurality of segments 228. One or more segments 228 may define borders of an object in the image 224.

Each segment 228 may have a centroid 230 with associated spatial coordinates 232. The LIDAR unit 214 may receive 302 the centroids 230 and/or associated spatial coordinates 232 from the image segmentation mapper 216. In some implementations, the LIDAR unit 214 may receive scanning instructions from a processor, such as processor 242. The scanning instructions may include commands and/or information for positioning, steering, directing, or otherwise achieving movement of the LIDAR unit 214 to sample the scene 222. In yet other implementations, the LIDAR unit 214 may receive the segments 228 or the image 224 and generate the segments 228 and/or the centroids.

The LIDAR unit 214 may perform 304 a LIDAR scan based on the spatial coordinates 232. The LIDAR unit 214 may be steered to sample the scene 222 at the spatial coordinates 232. For example, a steerable laser 234 may be steered to take samples of the scene 222 at the points corresponding to the spatial coordinates 232 of the centroids 230. In another example, the steerable laser 234 may be steered to take samples of the scene 222 at the points corresponding to the spatial coordinates 232 of the center of a bounding box around a given segment 228. The sampling points may also be determined according to other approaches (e.g., cluster center or morphological erosion).

The LIDAR unit 214 may determine depth values 238 at the spatial coordinates 232 of the segments 228. The depth values 238 may correspond to the distance of one or more objects from the LIDAR unit 214. In some implementations, the LIDAR unit 214 may provide data, for example timing data indicative of depth values, to a processor, such as processor 242, of the electronic device 202.

The LIDAR unit 214 may provide 306 the depth values 238 obtained by the LIDAR scan to a depth mapper 218 to create a depth map 220. The depth mapper 218 may receive the segments 228 of the image 224 from the image segmentation mapper 216. The depth mapper 218 may populate each segment 228 with the depth value 238 corresponding to the spatial coordinates 232 of the segment 228 provided by the LIDAR unit 214.

In one approach, the depth mapper 218 may populate each segment 228 with the depth value 238 of corresponding centroid 230 as determined by the LIDAR unit 214. In another approach, the depth mapper 218 may use the weighted average of adjacent segments 228 to populate each segment 228 with the depth value 238. In yet another approach, the depth mapper 218 may create the depth map 220 by merging the segments 228 with the depth values 238 based on the distance from the centroid 230.

Figure 4:
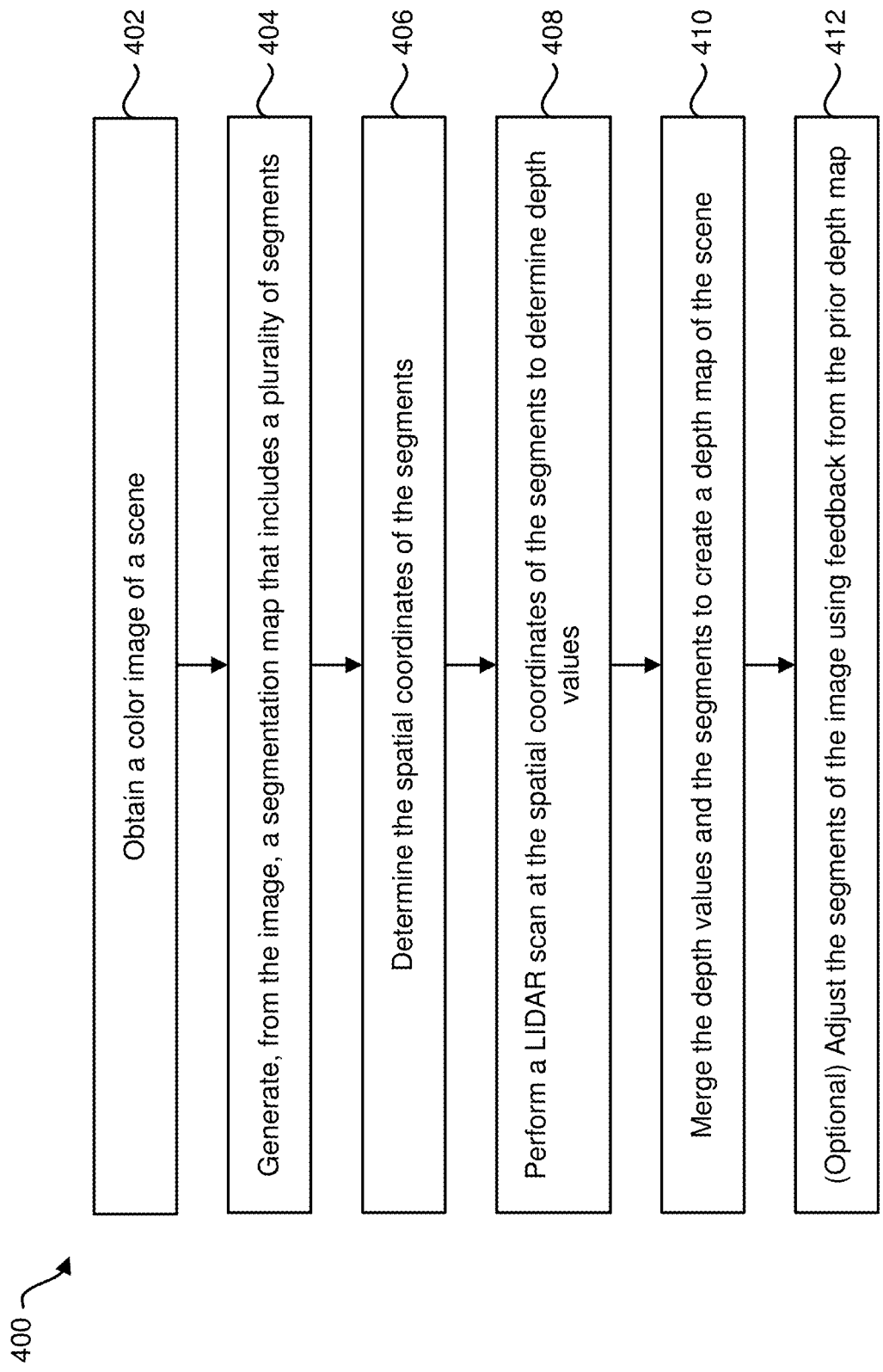
FIG. 4 is a flow diagram illustrating another method for performing image-assisted LIDAR depth map sampling.

FIG. 4 is a flow diagram illustrating another method 400 for performing image-assisted LIDAR depth map sampling. The method 400 may be implemented by, for example, an electronic device 202 as depicted in FIG. 2.

With reference to FIG. 2 and FIG. 4, the electronic device 202 may obtain 402 a color image 224 of a scene 222. For example, a camera 204 may capture the color image 224. The camera 204 may be positioned (e.g., mounted) on or near a LIDAR unit 214. The camera 204 may provide the image 224 to an image segmentation mapper 216.

The electronic device 202 may generate 404, from the image 224, a segmentation map 226 that includes a plurality of segments 228. One or more segments 228 may define borders of an object in the image 224. The number of segments 228 generated by the electronic device 202 may be determined according to different approaches. In one approach, the number of segments 228 may be a fixed number. In another approach, the number of segments 228 may be a maximum number. In another approach, the number of segments 228 may vary based on feedback 240. In yet another approach, the number of segments 228 may be determined as a function of image content, where a relatively complex scene 222 may utilize a greater number of segments 228 relative to a less complex scene.

The electronic device 202 may determine 406 the spatial coordinates 232 of the segments 228. The spatial coordinates 232 are indicative of a location of each segment 228 in the scene 222. The spatial coordinates 232 may be a sampling point for performing a LIDAR scan. In one implementation, the electronic device 202 may determine 406 the spatial coordinates 232 of the centroids 230 of segments 228. Each segment 228 may have a centroid 230. A centroid 230 may be expressed in terms of as spatial coordinates 232. For example, the centroid 230 may have an x (e.g., horizontal) coordinate and a y (e.g., vertical) coordinate. The spatial coordinates 232 of the segments 228 may also be determined according to other approaches (e.g., cluster center or morphological erosion).

The electronic device 202 may perform 408 a LIDAR scan at the spatial coordinates 232 of the segments 228 to determine depth values 238. The spatial coordinates 232 may be associated with a sampling point (e.g., centroid 230, center of a bounding box, cluster center or morphological erosion) associated with a segment 228. A steerable laser 234 may be steered to take samples of the scene 222 at the points corresponding to the spatial coordinates 232. For spatial coordinates 232 of a given segment 228, the electronic device 202 may analyze the amount of time that it takes light to reflect off of an object in the scene 222 to determine the depth value 238 for that location.

The electronic device 202 may merge 410 the depth values 238 and the segments 228 to create a depth map 220 of the scene 222. For example, the electronic device 202 may populate each segment 228 with the depth value 238 corresponding to the spatial coordinates 232 of the segment 228 as determined by the LIDAR scan.

The electronic device 202 may (optionally) adjust 412 the segments 228 of the image 224 using feedback 240 from the prior depth map 220. For example, the depth mapper 218 may provide feedback 240 to the image segmentation mapper 216. The image segmentation mapper 216 may generate more or fewer segments 228 based on the feedback 240 from the depth mapper 218 to optimize segmentation.

Figure 5B:
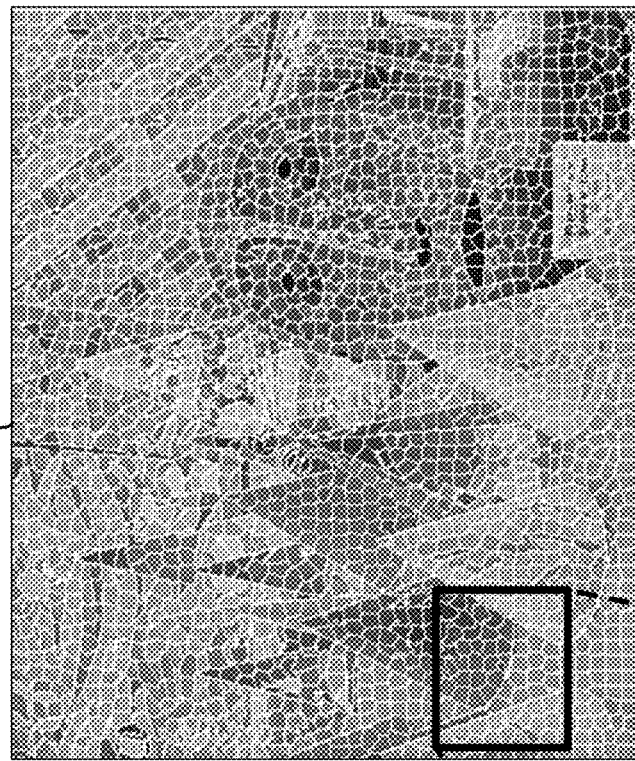
FIGS. 5A-5C illustrate an example of a segmentation map generated from an image.
Figure 5C:
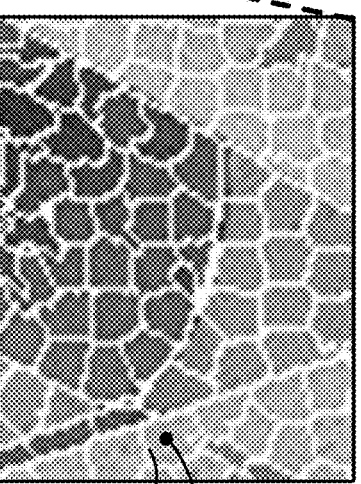
Figure 5A:
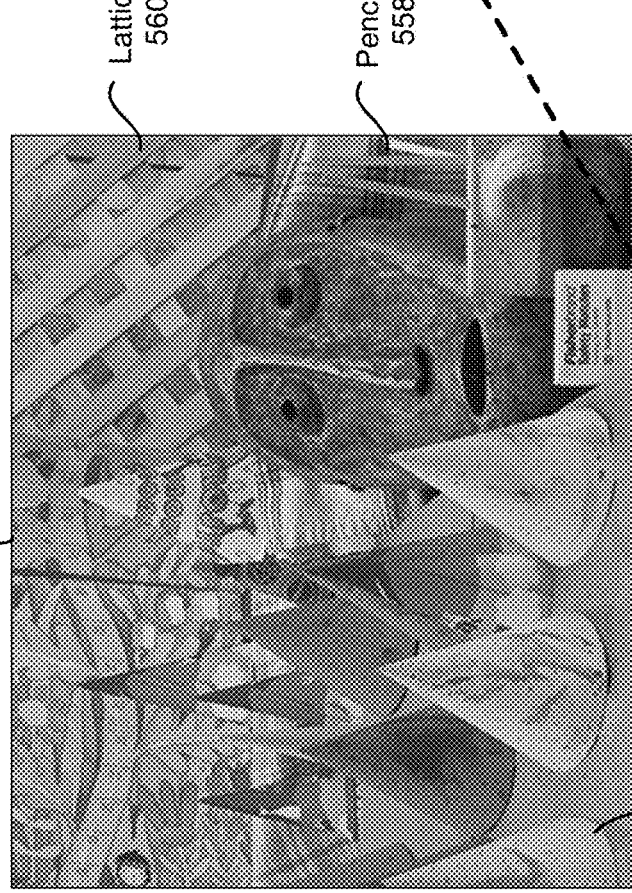

FIGS. 5A-5C illustrate an example of a segmentation map 526 generated from an image 524. The image 524 may be a color image captured by a camera 204 positioned on or near a LIDAR unit 214. The image 524 may be a picture of a scene 222 that includes one or more objects. The image 524 may be a digital image or may be obtained from a frame of a video.

In this example, the image 524 shown in FIG. 5A contains multiple objects at different depths. Some of the objects in the image 524 include cones 554 (in left of the image 524), a cup with pencils 558 (in the right foreground of the image 524) and a lattice 560.

A segmentation map 526 is generated from the image 524. Various factors may be considered when determining the number of segments 528 for segmentation of the image 524. Factors that can be relevant to determine the number of segments 528 may include image content/complexity, minimum frames per second (fps), desired accuracy (e.g. maximum segment size) and resource usage (e.g., battery usage/MIPS/time).

In this example, the segmentation map 526 includes 2,000 segments 528. In other examples, fewer or greater segments 528 may be utilized. As seen from FIGS. 5B and 5C, the segments 528 in this example are not uniform, but are irregular in geometry, size, and distribution in response to the content of the image 524. The borders of the segments 528 follow the object borders or edges from the image 524, as illustrated in FIG. 5C of the close-up view of the cone 554. It should be noted that for thin objects (e.g., the pencils 558 in the bottom right of the image 524), the width of the object may be defined by a single segment 528.

Each segment 528 has a corresponding centroid 530. In this example, a single centroid 530 is illustrated for a given segment. The centroid 530 may be characterized by spatial coordinates 232. These spatial coordinates 232 may be determined according to the location of the centroid 530 within the image 524. In an implementation, the centroid 530 may be expressed in terms of an x (e.g., horizontal) coordinate and a y (e.g., vertical) coordinate.

FIGS. 6A-6D illustrate an example of image-assisted LIDAR depth map 620 sampling. The image 624 depicted in FIG. 6A is the same image 524 of the scene described in connection with FIG. 5A. Among other objects, the image 624 includes multiple cones 654, pencils 656 and a lattice 660. The image 624 may be a digital image or may be obtained from a frame of a video.

The ground truth 662 is a reference to which a depth map 620 may be compared. The ground truth 662 is included in FIG. 6B to visually inspect the quality of the sampled depth maps 620 using the assisted and unassisted approaches, respectively. It should be noted that the ground truth 662 is not part of the systems and methods described herein.

The depth maps 620a-b illustrated in FIGS. 6C and 6D are visual representations of depth values 238. The depth values 238 are indicated as different shades within a depth map 620. Lighter shades in the depth map 620 indicate that the object is nearer to the LIDAR unit 214. Darker shades in the depth map 620 indicate that the object is farther from the LIDAR unit 214. Therefore, objects in the background of the scene are depicted as a darker shade in the depth map 620, while objects in the foreground of the scene are depicted as a lighter shade in the depth map 620.

It should be noted that the depth map image is one example visual depiction of the depth map information provided for visualization and illustrative purposes. In practice, a visualization of the depth may 620 be presented differently or not at all. Instead, the depth map information may be utilized for various operations or processes such as building a three dimensional model, indoor navigation, autonomous navigation, object detection and other applications.

An unassisted LIDAR depth map 620a is illustrated in FIG. 6C. The unassisted LIDAR depth map 620a was obtained using naïve regular LIDAR sampling of depth values 238. In this case, the LIDAR sampling was performed in a uniform fashion using 2,000 regularly spaced sampling points. Therefore, this approach does not consider the objects within the scene when determining where to perform a LIDAR scan.

The image-assisted LIDAR depth map 620b is generated according to the systems and methods described herein. In this case, a segmentation map 226 is created with 2,000 segments 228. The segment 228 borders follow object borders, as described in connection with FIG. 5. A LIDAR scan is then performed at the spatial coordinates 232 of the segments 228. The depth values 238 from the LIDAR scan are then populated in the corresponding segments 228 to generate the image-assisted LIDAR depth map 620b.

As observed by comparing FIGS. 6C and 6D, the unassisted LIDAR depth map 620a results in poor performance, especially at boundary lines. For example, the cones 654 in the unassisted LIDAR depth map 620a of FIG. 6C are segmented and the lattice 660 openings are misshapen. Also, thin objects (e.g., the pencils 656) may fall between sampling points and may fail to be detected by the LIDAR scan, as demonstrated in FIG. 6C.

LIDAR sampling may use a relatively dense horizontal grid, with fairly accurate resolution (e.g., 0.1 degrees). However, in the vertical field, the resolution may be a fairly coarse resolution (e.g., ranging from 0.5 degrees to 4 degrees). The vertical field of view may be limited, e.g., between 8-20 degrees. The scanning rate is usually between 10 fps-50 fps.

With these assumptions, one LIDAR scan could be acquired in one frame, ranging from 20 ms to 100 ms. This is a sufficient interval to have the system account for motion and/or jitter. For example, an inertial measurement unit (IMU) may be used to account for motion and/or jitter of the LIDAR unit 114. The IMU may be coupled with the LIDAR unit 114 to interpolate egomotion-centric data (e.g., data relating to the three-dimensional motion of the LIDAR unit 114 within the environment) into something that is referenced in the world-wide coordinate system.

The same goes to the vehicle motion in implementations where the LIDAR unit is coupled to a vehicle. By default, the raw data from the LIDAR unit 114 will provide a point cloud in the local system of coordinates. Since the described system may be located on a moving platform (e.g., vehicle), this movement may be addressed in order to translate these points to the globally referenced system of coordinates.

As demonstrated by the example illustrated in FIGS. 6A, 6B, 6C and 6D, the accuracy of the depth map 620b generated by the image-assisted LIDAR depth map 620b is better than the depth map 620a generated by the unassisted LIDAR depth map 620a. While the depth maps 620 in this example use the same number of scan points (i.e., 2,000), it should be noted that a depth map 620 generated according to the image-assisted LIDAR sampling approach using fewer scan points may be more accurate than a depth map 620 generated according to the unassisted approach with more scan points.

Because the image-assisted approach takes into account the objects in the scene when segmenting the image 624, fewer segments 228 may be required to represent different objects. The segments 228 may be generated to preserve the borders (e.g., edges) between objects in the image 224. Large segments 228 that preserve the borders between objects may be sufficient to generate an accurate depth map 620 according to the image-assisted approach described herein. Therefore, depth maps 620 generated with lower segmentation densities may provide sufficient accuracy. Furthermore, using larger segments 228 results in fewer segments 228, which in turn results in fewer scan points. By using fewer LIDAR samples to generate the depth map 620, the electronic device 202 may achieve efficiency gains (e.g., processing, battery consumption, time, etc.), while retaining sufficient accuracy.

The image-assisted LIDAR depth map 620b is more accurate than the unassisted LIDAR depth map 620a. Because the segments 228 follow the borders of the objects in the image 624, the image-assisted LIDAR depth map 620b in FIG. 6D retains sharper edges of the objects (e.g., the cones 654 and lattice 660 openings) as compared to the unassisted LIDAR depth map 620a. Furthermore, thin objects (e.g., the pencils 656) are captured in the image-assisted LIDAR depth map 620b.

Figure 7A:
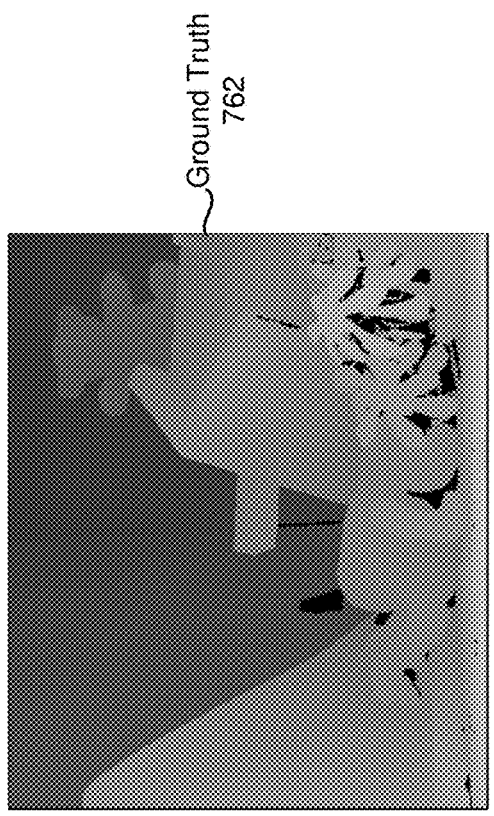
FIGS. 7A-7D illustrate another example of image-assisted LIDAR depth map sampling.
Figure 7B:
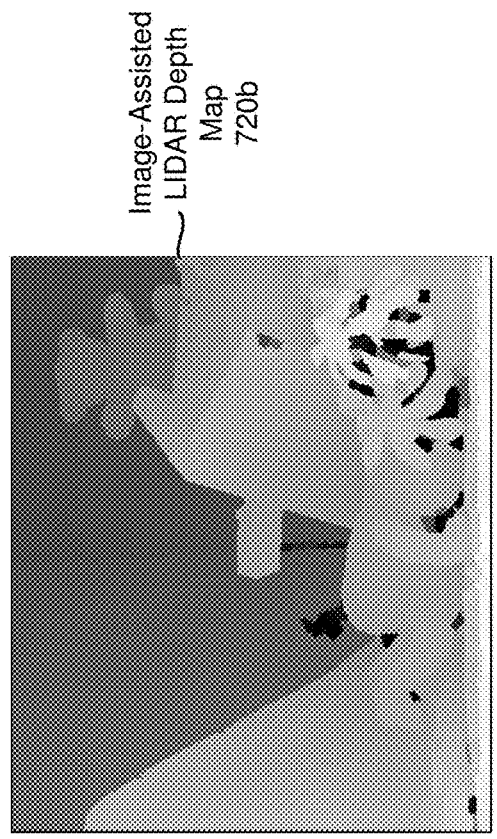

FIGS. 7A-7D illustrate another example of image-assisted LIDAR depth map 720 sampling. An image 724 of a scene is shown in FIG. 7A with a corresponding ground truth 762 shown in FIG. 7B. Among other objects, the image 724 includes fabric 764, a plant 766 and a birdhouse 768.

Figure 7C:
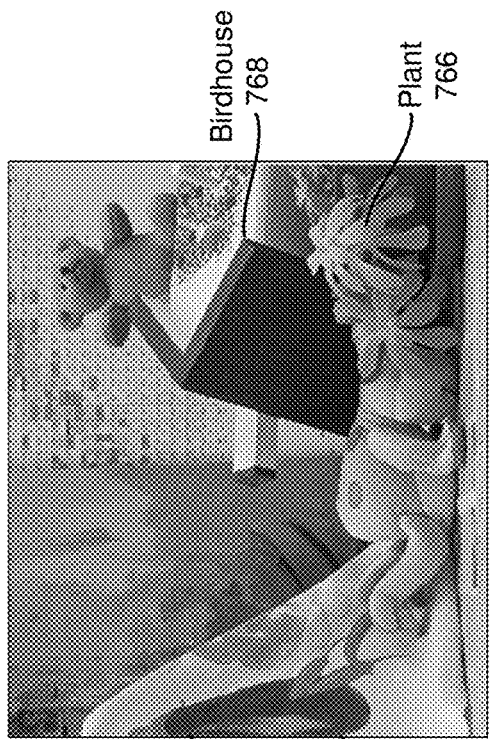

An unassisted LIDAR depth map 720a is illustrated in FIG. 7C. The unassisted LIDAR depth map 720a was obtained using naïve regular LIDAR sampling of depth values 238. In this case, the LIDAR sampling was performed in a uniform fashion using 2,000 regularly spaced sampling points. Therefore, this approach does not consider the objects within the scene when determining where to perform a LIDAR scan.

The image-assisted LIDAR depth map 720b is generated according to the systems and methods described herein. In this case, a segmentation map 226 is created with 2,000 segments 228. The segment 228 borders follow object borders, as described in connection with FIG. 5. A LIDAR scan is then performed at the spatial coordinates 732 of the segments 228. The depth values 238 from the LIDAR scan are then populated in the corresponding segments 228 to generate the image-assisted LIDAR depth map 720b.

Figure 7D:
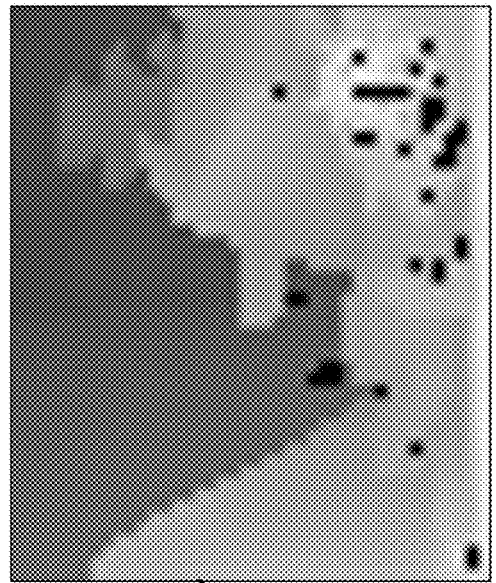

As observed by comparing FIGS. 7C and 7D, the image-assisted LIDAR depth map 720b results in better performance, especially at object boundary lines. The edges of the fabric 764, the leaves of the plant 766 and the roof of the birdhouse 768 are sharper in the image-assisted LIDAR depth map 720b in FIG. 7D as compared to the unassisted LIDAR depth map 720a of FIG. 7C.

Figure 8:
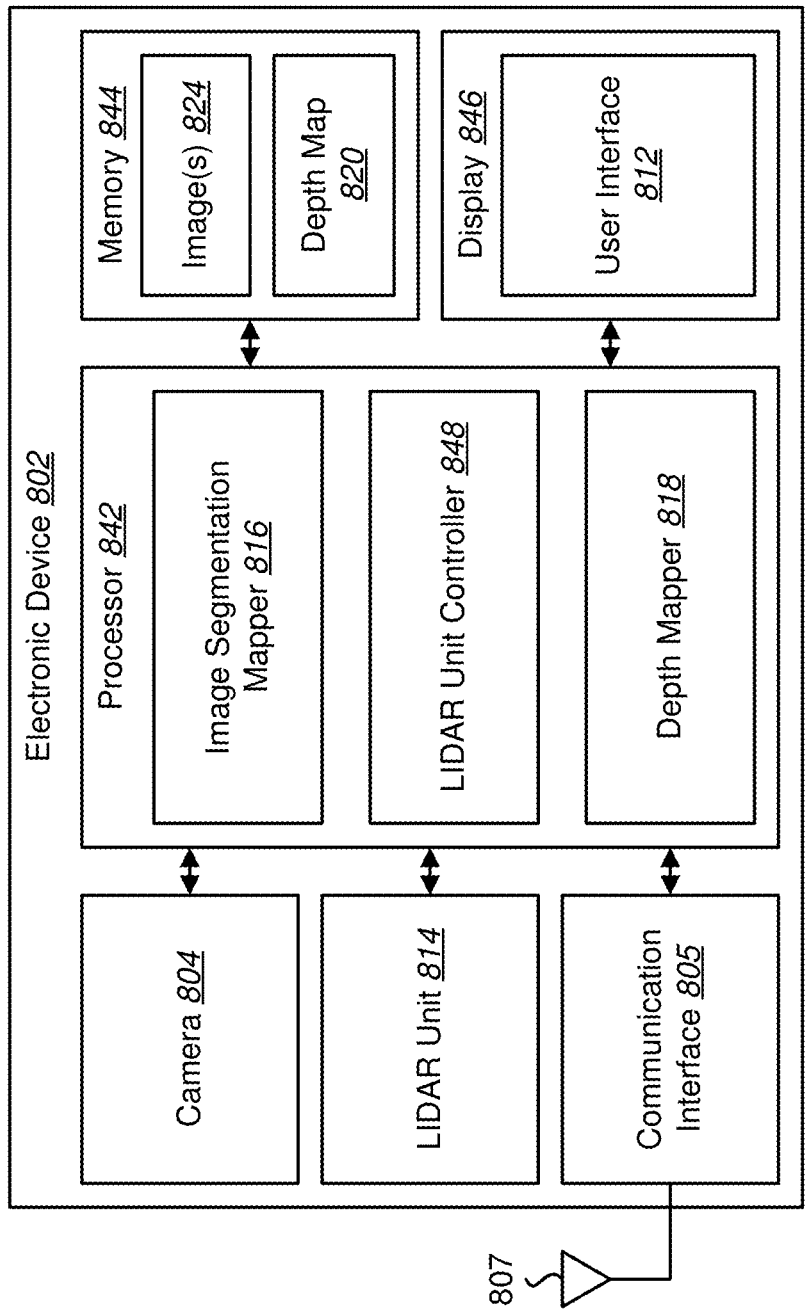
FIG. 8 is a block diagram illustrating one example of an electronic device in which systems and methods for image-assisted LIDAR depth map sampling may be implemented.

FIG. 8 is a block diagram illustrating one example of an electronic device 802 in which systems and methods for image-assisted LIDAR depth map sampling may be implemented. Examples of the electronic device 802 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 802 may include one or more components or elements. One or more of the components or elements may be implemented in hardware (e.g., circuitry) or a combination of hardware and software (e.g., a processor with instructions).

In some configurations, the electronic device 802 may include a processor 842, a memory 844, a display 846, a camera 804, a LIDAR unit 814, and/or a communication interface 805. The processor 842 may be coupled to (e.g., in electronic communication with) the memory 844, display 846, the camera 804, the LIDAR unit 814, and/or communication interface 805. It should be noted that one or more of the elements illustrated in FIG. 8 may be optional. In particular, the electronic device 802 may not include one or more of the elements illustrated in FIG. 8 in some configurations. For example, the electronic device 802 may or may not include a communication interface 805. Additionally or alternatively, the electronic device 802 may or may not include a display 846.

The communication interface 805 may enable the electronic device 802 to communicate with one or more other electronic devices. For example, the communication interface 805 may provide an interface for wired and/or wireless communications. In some configurations, the communication interface 805 may be coupled to one or more antennas 807 for transmitting and/or receiving radio frequency (RF) signals. Additionally or alternatively, the communication interface 805 may enable one or more kinds of wireline (e.g., Universal Serial Bus (USB), Ethernet, etc.) communication.

In some configurations, multiple communication interfaces 805 may be implemented and/or utilized. For example, one communication interface 805 may be a cellular (e.g., 3G, Long Term Evolution (LTE), CDMA, etc.) communication interface 805, another communication interface 805 may be an Ethernet interface, another communication interface 805 may be a universal serial bus (USB) interface, and yet another communication interface 805 may be a wireless local area network (WLAN) interface (e.g., Institute of Electrical and Electronics Engineers (IEEE) 802.11 interface).

In some configurations, the electronic device 802 may perform one or more of the functions, procedures, methods, steps, etc., described in connection with one or more of FIGS. 1-8. Additionally or alternatively, the electronic device 802 may include one or more of the structures described in connection with one or more of FIGS. 1-8. In some configurations, the image-assisted LIDAR depth map sampling described in connection with FIG. 8 may be implemented in conjunction with one or more of the approaches described in connection with one or more of FIGS. 1-8. It should be noted that the image-assisted LIDAR depth map sampling described in connection with FIG. 8 may be implemented in addition to or alternately from one or more of the approaches to image scanning and/or object tracking described in connection with one or more of FIGS. 1-8.

The electronic device 802 may obtain one or more images 824 (e.g., digital images, image frames, video, etc.). For example, the electronic device 802 may include a camera 804 with an optical system 106 (e.g., lenses) and an image sensor 108. In some configurations, the camera 804 may capture the one or more images 824. The camera 804 may be coupled to and/or controlled by the processor 842. Additionally or alternatively, the electronic device 802 may request and/or receive the one or more images 824 from another device (e.g., an external image sensor coupled to the electronic device 802, a network server, traffic camera, drop camera, automobile camera, web camera, etc.). In some configurations, the electronic device 802 may request and/or receive the one or more images 824 via the communication interface 805. For example, the electronic device 802 may or may not include a camera 804 and may receive images 824 from a remote device.

One or more images 824 may be stored in the memory 844. One or more of the images 824 may include an object in a scene 222.

The memory 844 may store instructions and/or data. The processor 842 may access (e.g., read from and/or write to) the memory 844. Examples of instructions and/or data that may be stored by the memory 844 may include image data (e.g., one or more images 824), image segmentation mapper 816 instructions, LIDAR unit 814 instructions, depth mapper 818 instructions, and/or instructions for other elements, etc. In some configurations, the electronic device 802 (e.g., the memory 844) may include an image data buffer (not shown). The image data buffer may buffer (e.g., store) image data (e.g., images 824) from the camera 804. The buffered image data may be provided to the processor 842.

In some configurations, the electronic device 802 may include a camera software application and/or a display 846. When the camera application is running, images 824 of objects that are located within the field of view of the camera 804 may be captured by the camera 804. The images 824 that are being captured by the camera 804 may be presented on the display 846. In some configurations, these images 824 may be displayed in rapid succession at a relatively high frame rate so that, at any given moment in time, the objects that are located within the field of view of the camera 804 are presented on the display 846. The one or more images 824 obtained by the electronic device 802 may be one or more video frames and/or one or more still images.

The processor 842 may include and/or implement an image segmentation mapper 816, a LIDAR unit controller 848 and/or a depth mapper 818. In some configurations, the processor 842 may be an example of the processor 242 described in connection with FIG. 2. It should be noted that one or more of the elements illustrated in the electronic device 802 and/or processor 842 may be optional. For example, one or more of the elements illustrated in the processor 842 may or may not be included and/or implemented. Additionally or alternatively, one or more of the elements illustrated in the processor 842 may be implemented separately from the processor 842 (e.g., in other circuitry, on another processor, on a separate electronic device, etc.). For example, the LIDAR unit controller 848 may not be implemented on the electronic device 802.

The processor 842 may include and/or implement an image segmentation mapper 816. In some configurations, the image segmentation mapper 816 may be an example of one or more of the image segmentation mapper 116, 216 described in connection with one or more of FIGS. 1-2. The image segmentation mapper 816 may generate a segmentation map 226 from an image 824 of the scene 222. The segmentation map 226 may include a plurality of segments 228.

The processor 842 may include and/or implement a LIDAR unit controller 848. The LIDAR unit controller 848 may receive spatial coordinates 230 of the centroids 230 of the segments 228. The LIDAR unit controller 848 may instruct the LIDAR unit 814 to perform a LIDAR scan at the spatial coordinates 232 of the centroids 230. The LIDAR unit 814 may be steered to sample the scene 222 at the spatial coordinates 232. The LIDAR unit 814 may determine depth values 238 of the scene 222 at the spatial coordinates 232 of the centroids 230.

The processor 842 may include and/or implement a depth mapper 818. In some configurations, the depth mapper 818 may be an example of one or more of the depth mappers 118, 218 described herein. One or more of the depth values 238 may be provided to the depth mapper 818. The depth mapper 818 may populate each segment 228 with the depth value 238 of the centroid 230 of the segment 228 to create a depth map 820.

In some configurations, electronic device 802 may perform assisted driving based on the depth map 820. For example, the processor 842 may include (e.g., implement) or may communicate with an advanced driver assistance system (ADAS). For instance, the electronic device 802 (e.g., ADAS) may perform assisted driving based on the depth map 820. The electronic device 802 may perform one or more operations based on the depth map 820. Examples of operations may include object detection and/or object tracking. Examples of operations may also include displaying an indicator (e.g., a speed limit, a stop sign, a pedestrian warning, a potential collision warning, a lane departure warning, a street name, an address, etc.), outputting a sound (e.g., a chime, an alarm, speech, honking a vehicle horn, etc.), controlling vehicle speed (e.g., driving at the posted speed limit, braking to avoid a collision, etc.), controlling vehicle steering (e.g., turning to avoid a collision, parallel parking, etc.), controlling vehicle climate (e.g., controlling a defroster or defogger, etc.), controlling vehicle lights (e.g., turning on fog lights, activating emergency flashers, controlling turn signals, etc.). It should be noted that the electronic device 802 may be separate from or may be integrated into an automobile in some configurations.

In some configurations, the processor 842 may include and/or implement one or more other elements. For example, the processor 842 may include an object detector, object tracker, etc.

In some configurations, the electronic device 802 may present a user interface 812 on the display 846. For example, the user interface 812 may enable a user to interact with the electronic device 802. In some configurations, the display 846 may be a touchscreen 110 that receives input from physical touch (by a finger, stylus or other tool, for example). Additionally or alternatively, the electronic device 802 may include or be coupled to another input interface. For example, the electronic device 802 may include a camera facing a user and may detect user gestures (e.g., hand gestures, arm gestures, eye tracking, eyelid blink, etc.). In another example, the electronic device 802 may be coupled to a mouse and may detect a mouse click.

It should be noted that no user input may be necessary in some configurations. For example, the electronic device 802 may automatically perform image-assisted LIDAR depth map sampling.

Figure 9:
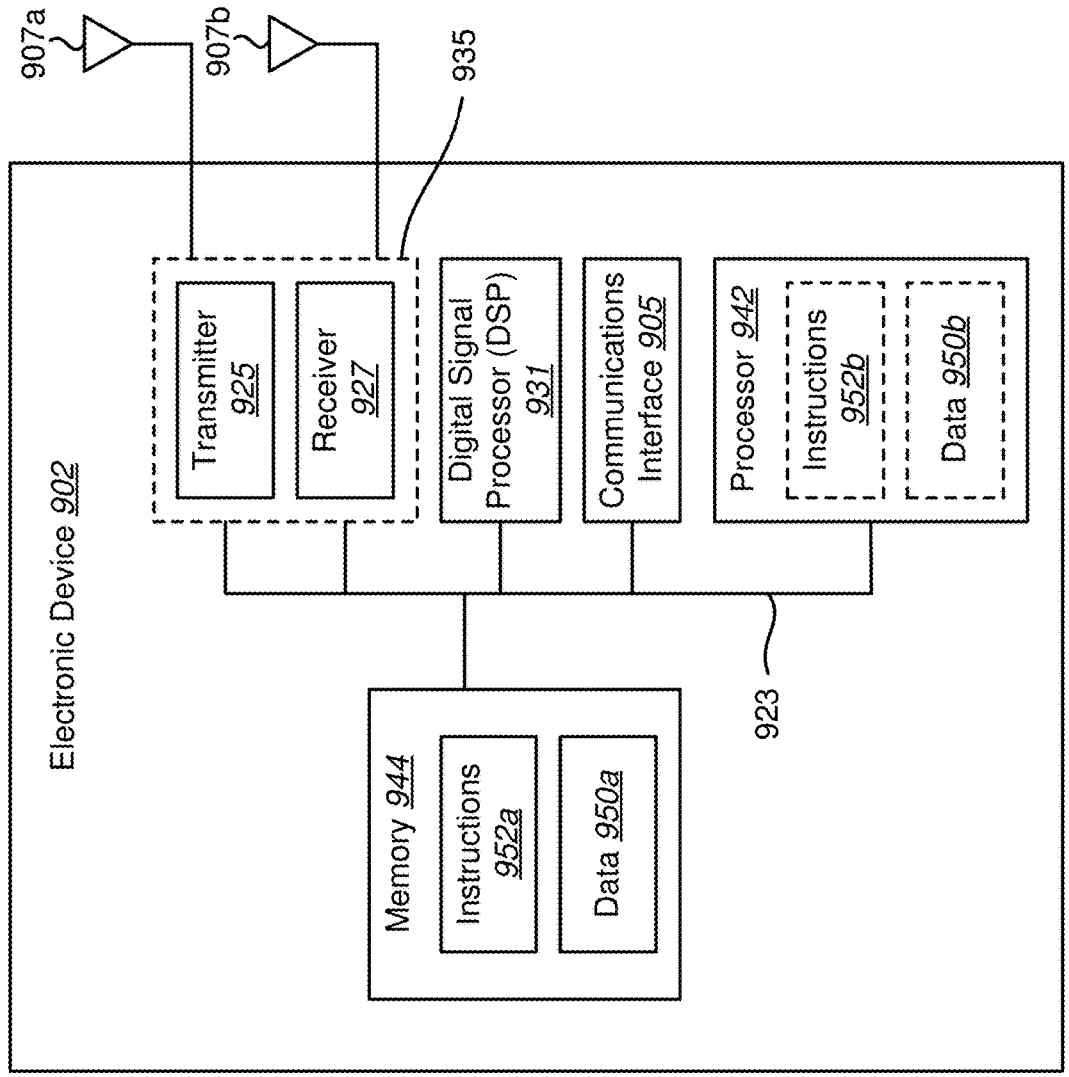
FIG. 9 illustrates certain components that may be included within an electronic device.

FIG. 9 illustrates certain components that may be included within an electronic device 902. The electronic device 902 may be or may be included within a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 902 includes a processor 942. The processor 942 may be a general purpose single- or multi-chip microprocessor (e.g., an ARM), a special purpose microprocessor (e.g., a digital signal processor (DSP)), a microcontroller, a programmable gate array, etc. The processor 942 may be referred to as a central processing unit (CPU). Although just a single processor 942 is shown in the electronic device 902, in an alternative configuration, a combination of processors (e.g., an ARM and DSP) could be used.

The electronic device 902 also includes memory 944. The memory 944 may be any electronic component capable of storing electronic information. The memory 944 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 950$a$ and instructions 952$a$ may be stored in the memory 944. The instructions 952$a$ may be executable by the processor 942 to implement one or more of the methods described herein. Executing the instructions 952$a$ may involve the use of the data that is stored in the memory 944. When the processor 942 executes the instructions 952, various portions of the instructions 952$b$ may be loaded onto the processor 942, and various pieces of data 950$b$ may be loaded onto the processor 942.

The electronic device 902 may also include a transmitter 925 and a receiver 927 to allow transmission and reception of signals to and from the electronic device 902. The transmitter 925 and receiver 927 may be collectively referred to as a transceiver 935. One or multiple antennas 907$a$-$b$ may be electrically coupled to the transceiver 935. The electronic device 902 may also include (not shown) multiple transmitters, multiple receivers, multiple transceivers and/or additional antennas.

The electronic device 902 may include a digital signal processor (DSP) 931. The electronic device 902 may also include a communications interface 905. The communications interface 905 may allow enable one or more kinds of input and/or output. For example, the communications interface 905 may include one or more ports and/or communication devices for linking other devices to the electronic device 902. Additionally or alternatively, the communications interface 905 may include one or more other interfaces (e.g., touchscreen, keypad, keyboard, microphone, camera, etc.). For example, the communication interface 905 may enable a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 923.

In accordance with the present disclosure, a circuit, in an electronic device, may be adapted to obtain receive spatial coordinates from an image segmentation mapper. The spatial coordinates may be generated based on an image of a scene. The same circuit, a different circuit, or a second section of the same or different circuit may be adapted to perform vertical processing of the depth map to perform a LIDAR scan. A LIDAR unit may be steered to sample the scene at the spatial coordinates. The same circuit, a different circuit, or a third section of the same or different circuit may be adapted to provide depth values obtained by the LIDAR scan to a depth mapper to create a depth map. In addition, the same circuit, a different circuit, or a fourth section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for obtaining depth information of a scene using an electronic device, comprising:
  receiving a plurality of two dimensional (2D) images of a scene;
  determining, in a first 2D image of the plurality of 2D images, object borders for an object within the scene;
  preparing a first segmentation of the object in the first 2D image, the first segmentation including a plurality of object segments based on the determined object borders, wherein the plurality of object segments are areas located within the object borders;
  determining a first set of locations for at least a portion of the plurality of object segments of the first segmentation, each location representative of the associated object segment location in the object;
  providing the first set of locations to a LIDAR unit configured to obtain depth information representative of depth of the scene at each of the first set of locations;

determining, in a second 2D image of the plurality of 2D images, object borders for the object; and preparing a second segmentation of the object in the second 2D image, the second segmentation including a plurality of object segments based on the obtained depth information and the object borders, wherein the second segmentation of the object has a reduced number of object segments relative to the first segmentation.

2. The method of claim 1, wherein the number of object segments of the second segmentation is reduced relative to the first segmentation, based on combining at least two neighboring object segments of the second segmentation having substantially equal depths, wherein the segment depths are determined from the obtained depth information for the at least two neighboring object segments.

3. The method of claim 2, wherein the number of object segments of the second segmentation is reduced relative to the first segmentation, further based on at least two neighboring object segments having similar color as determined from analysis of at least one of the plurality of received 2D images.

4. The method of claim 2, wherein the number of object segments in the second segmentation is reduced relative to the first segmentation, further based on at least one of a performance metric or a resource usage metric of the electronic device.

5. The method of claim 1, further comprising:
determining a second set of locations for at least a portion of the plurality of object segments of the second segmentation, each location representative of the associated object segment location of the second set of locations in the scene;
providing the second set of locations to the LIDAR unit to obtain depth information representative of depth at each of the second set of locations in the scene; and
determining at least one updated depth value of the object based on the obtained depth information for the second set of locations.

6. The method of claim 5, further comprising: detecting the object as one of a pedestrian, a vehicle, a traffic signal, or a traffic sign; and determining, based on the determined at least one updated depth value of the object, a corrective action for a vehicle communicatively coupled to the electronic device.

7. The method of claim 1, wherein each segment location comprises horizontal and vertical spatial coordinates in image space for the first or second 2D images, and wherein providing the first set of locations further comprises transforming the spatial coordinates from image space to LIDAR space.

8. The method of claim 7, wherein each segment location is determined as one of a centroid of the segment or a center of a bounding box around the segment.

9. The method of claim 1, wherein at least a portion of the object segments are characterized as having at least one of an irregular geometry, size, or distribution.

10. An electronic device for obtaining depth information of a scene, comprising:
a memory; and
at least one processor coupled to the memory, the at least one processor configured to:
receive a plurality of two dimensional (2D) images of a scene;
determine, in a first 2D image of the plurality of 2D images, object borders for an object within the scene;
prepare a first segmentation of the object in the first 2D image, the first object segmentation including a plurality of object segments based on the determined object borders, wherein the plurality of object segments are areas located within the object borders;
determine a first set of locations for at least a portion of the plurality of object segments of the first segmentation, each location representative of the associated segment location in the object;
provide the first set of locations to a LIDAR unit in communication with the at least one processor, wherein the LIDAR unit is configured to obtain depth information representative of depth of the scene at each of the first set of locations;
determine, in a second 2D image of the plurality of 2D images, object borders for the object; and
prepare a second segmentation of the object in the second 2D image, the second segmentation including a plurality of object segments based on the obtained depth information and the object borders, wherein the second segmentation of the object has a reduced number of object segments relative to the first segmentation.

11. The electronic device of claim 10, wherein the processor is configured to reduce the number of object segments of the second segmentation relative to the first segmentation, based on at least two neighboring object segments of the second segmentation having substantially equal depths, wherein the segment depths are determined from the obtained depth information for the at least two neighboring object segments.

12. The electronic device of claim 11, wherein the processor is configured to reduce the number of object segments of the second segmentation relative to the first segmentation, further based on at least two neighboring object segments having similar color as determined from analysis of at least one of the plurality of received 2D images.

13. The method of claim 11, wherein the processor is configured to reduce the number of object segments in the second segmentation relative to the first segmentation, further based on at least one of a performance metric or a resource usage metric of the at least one processor.

14. The electronic device of claim 10, wherein the processor is configured to:
determine a second set of locations for at least a portion of the plurality of object segments of the second segmentation, each location representative of the associated segment location in the scene;
provide the second set of locations to the LIDAR unit to obtain depth information representative of depth at the second set of locations in the scene; and
determine at least one updated depth value of the object based on the obtained depth information for the second set of locations.

15. The electronic device of claim 14, wherein the processor is configured to:
detect the object as one of a pedestrian, a vehicle, a traffic signal, or a traffic sign; and
determine, based on the determined at least one updated depth value of the object, a corrective action for a vehicle communicatively coupled to the electronic device.

16. The electronic device of claim 10, wherein each segment location comprises horizontal and vertical spatial coordinates in image space for the first or second 2D images, and wherein the processor is configured to transform the spatial coordinates from image space to LIDAR space.

17. The electronic device of claim 16, wherein the segment location is determined as one of a centroid of the segment or a center of a bounding box around the segment.

18. The electronic device of claim 10, wherein at least a portion of the object segments are characterized as having at least one of an irregular geometry, size, or distribution.

19. An apparatus for automated control of a vehicle, comprising:
a memory; and
at least one processor coupled to the memory, the at least one processor configured to:
generate a first plurality of spatial coordinate sets based on content analysis of a first received image, each spatial coordinate set indicative of a location of a segment within a first object in the first received image, wherein at least a portion of the segments are irregular in geometry and size and the segments are non-uniformly distributed within the first object;
provide the first plurality of spatial coordinate sets to a LIDAR unit communicatively coupled to the processor to selectively obtain, at locations in a scene external to the vehicle representative of the first plurality of spatial coordinates, information indicative of depth;
determine a position of the first object relative to the vehicle based on the depth information received from the LIDAR unit and the first plurality of spatial coordinate sets; and
determine an instruction for a vehicle operation based on the determined position of the first object.

20. The apparatus of claim 19, wherein the processor is further configured to:
generate a second plurality of spatial coordinate sets for the first object based on the received depth information and the first plurality of spatial coordinate sets, wherein the second plurality of spatial coordinate sets is distributed differently relative to the first plurality of spatial coordinate sets within the first object; and
provide the second plurality of spatial coordinate sets to the LIDAR unit to selectively obtain, at locations in the scene external to the vehicle representative of the second plurality of spatial coordinates, updated information indicative of depth.

21. The apparatus of claim 20, wherein the first plurality of spatial coordinate sets and the received depth information are transformed based on movement of the vehicle.

22. The apparatus of claim 20, wherein content analysis comprises the processor configured to perform at least one of: determine a plurality of borders of the first object; or determine color or gray level differences of the first object.

23. The apparatus of claim 22, wherein at least a portion of the plurality of borders possess irregular geometry aligning with the one or more of objects.

24. The apparatus of claim 19, wherein the processor or the LIDAR unit is configured to transform the first plurality of spatial coordinate sets to a LIDAR coordinate space.

25. The apparatus of claim 19, wherein the first object obstacle is one of a second vehicle, a pedestrian, a lane boundary, or a sign.

26. The apparatus of claim 19, wherein the vehicle operation is at least one of a speed change, a braking operation, a steering operation, or a driver or passenger notification.

27. A method for automated control of a vehicle, comprising:
generating a first plurality of spatial coordinate sets based on content analysis of a first received image, each spatial coordinate set indicative of a location of a segment within a first object in the first received image, wherein at least a portion of the segments are irregular in geometry and size and the segments are non-uniformly distributed within the first object;
providing the first plurality of spatial coordinate sets to a LIDAR unit to selectively obtain, at locations in a scene external to the vehicle representative of the first plurality of spatial coordinates, information indicative of depth;
determining a position of the first object relative to the vehicle based on the depth information received from the LIDAR unit and the first plurality of spatial coordinate sets; and
determining an instruction for a vehicle operation based on the determined position of the first object.

28. The method of claim 27, further comprising:
generating a second plurality of spatial coordinate sets for the first object based on the received depth information and the first plurality of spatial coordinate sets, wherein the second plurality of spatial coordinate sets is distributed differently relative to the first plurality of spatial coordinate sets in the first object; and
providing the second plurality of spatial coordinate sets to the LIDAR unit to selectively obtain, at locations in the scene external to the vehicle representative of the second plurality of spatial coordinates, updated information indicative of depth.

29. The method of claim 27, wherein content analysis comprises at least one of: determining a plurality of borders for the first object; or determining color or gray level differences for the first object.

30. The method of claim 29, wherein at least a portion of the plurality of borders possess irregular geometry aligning with the one or more of objects.

* * * * *